United States Patent [19]

Leung et al.

[11] Patent Number: 5,169,574
[45] Date of Patent: Dec. 8, 1992

[54] ADJUSTABLE CLAMP LOAD FOR PRODUCING A FOAMED PANEL

[75] Inventors: Richard K. Leung, Farmington Hills; James H. Zimmerman, Saline; Gerald A. Heath, Canton, all of Mich.

[73] Assignee: Ford Motor Company, Dearborn, Mich.

[21] Appl. No.: 742,112

[22] Filed: Aug. 8, 1991

[51] Int. Cl.[5] .......................................... B29C 67/22
[52] U.S. Cl. ................................ 264/40.5; 264/46.4; 264/46.7
[58] Field of Search ................. 264/46.6, 46.7, 46.5, 264/46.8, 40.5, 55, 45.2, 328.7, 40.3, 40.6, 46.4

[56] References Cited

U.S. PATENT DOCUMENTS

| | | | |
|---|---|---|---|
| 3,265,783 | 8/1966 | Jacobs | 264/46.5 |
| 3,801,244 | 4/1974 | Eisenberg | 264/53 |
| 3,993,421 | 11/1976 | Adair | 264/25 |
| 4,031,176 | 6/1977 | Molbert | 264/328.7 |
| 4,208,365 | 6/1980 | Lefevre | 264/1 |
| 4,303,728 | 12/1981 | Houdek et al. | 428/315 |
| 4,318,874 | 3/1982 | Lemelson | 264/40.1 |
| 4,389,358 | 6/1983 | Hendry | 264/328.7 |
| 4,420,447 | 12/1983 | Nakashima | 264/46.7 |
| 4,424,180 | 1/1984 | Lalloz et al. | 264/51 |
| 4,473,215 | 9/1984 | Rathfon, II et al. | 264/40.5 |
| 4,681,725 | 7/1987 | Maruyama | 264/46.6 |
| 4,765,935 | 8/1988 | Florentini | 264/40.7 |
| 4,791,019 | 12/1988 | Ohta et al. | 428/304.4 |
| 4,806,293 | 2/1989 | Akiyama et al. | 264/53 |
| 4,844,847 | 7/1989 | Harada | 264/40.5 |
| 4,847,024 | 7/1989 | Loren | 264/46.7 |
| 4,942,006 | 7/1990 | Loren | 264/328.8 |
| 4,959,184 | 9/1990 | Akai et al. | 264/40.3 |
| 4,976,414 | 12/1990 | Yanagishita | 264/40.3 |
| 5,023,031 | 6/1991 | West et al. | 264/46.9 |

Primary Examiner—Allan R. Kuhns
Attorney, Agent, or Firm—Damian Porcari; Clifford L. Sadler

[57] ABSTRACT

A method of manufacturing an article having a substructure with a wall having a wall surface and a foam layer along the wall surface, including the steps of: placing the substructure in a tool having a die surface being spaced apart from the wall surface; injecting a foamable material between the die surface and the wall; applying a clamp load between the die surface and the foamable material; allowing the foamable material to expand and exert a force on the wall; and reducing the clamp load on the foamable material to reduce the force exerted on the wall by the expanding material whereby the force exerted on the wall does not deform the article.

6 Claims, 3 Drawing Sheets

ADJUSTABLE CLAMP LOAD FOR PRODUCING A FOAMED PANEL

FIELD OF THE INVENTION

This invention relates to the manufacture of a foamed panel. More specifically, this invention relates to a method of manufacturing a foamed panel having a rigid substructure which is not completely supported by a die tool.

BACKGROUND OF THE INVENTION

The invention relates to a method of manufacturing foamed panels, specifically panels having a rigid substructure and a foam layer. In the preferred embodiment of the invention, the foam is covered by a finishing layer. Foamed panels are useful in many applications, including lining the interior of automobiles. A rigid panel, generally made of a plastic or a woodstock base material, is provided with a covering. The covering may be a vinyl sheet or other formable material. To provide an attractive feel and appearance, foam material is placed between the rigid substructure and the covering. Various components having a hollow or partially hollow cross-section are often placed adjacent the substructure. Automotive instrument panels, for example, have reinforcement beams or ducts placed adjacent the panel. It is desirable to integrally mold the substructure with these beams or ducts. However, using conventional manufacturing techniques, the substructure cannot be completely supported by the mold die and the pressure from the foaming operation deforms the unsupported sections of the panel.

A method for producing a close-mold foamed composite panel is shown and described in U.S. Pat. No. 4,303,728, issued to Houdek et al, Dec. 1, 1981. Houdek et al teaches a method of producing a foamed composite panel which does not have hollow or partially hollow sections by placing a finishing layer in the cavity of a first die. A rigid substructure is overlaid the finishing layer and spaced apart therefrom. An second die is overlaid the rigid substructure. The first and second dies are brought together and a space is maintained between the sheet and rigid substructure. A foaming material is injected within the space and allowed to cure. The second die generally completely supports the rigid substructure and prevents deflection of the substructure during the foaming. Expansion of the foam is limited to the space defined between the rigid substructure and sheet. The second die prevents deflection of the rigid substructure by the expanding foam. Deflection of the rigid substructure would cause an increase in the space and thickness of the foam. Houdek et al teaches a second die having an interior surface conforming generally to a rigid substructure. The rigid substructure is nearly completely supported by the second die during the foaming process.

It is desirable in some applications, such as automotive instrument panels, to produce a rigid substructure having hollow or partially hollow sections for the ventilating ducts, support brackets, reinforcement ribbing, and the like. These hollow and partially hollow sections prevent completely supporting the rigid substructure by the die during the foaming process. When the rigid substructure is not completely supported by the die, deflection of the rigid substructure by the expanding foam occurs and produces a finished article having an irregular surface finish.

In some instances, it may be desirable to produce articles having a channel section with a nonuniform foam thickness. These channels will have thicker sections of foam in the area of the channel. Panels produced by conventional methods often experience greater foam shrinkage in the channel area than the thinner areas of the panel. This greater foam shrinkage produces ripples in the finished article.

U.S. Pat. No. 4,791,019, issued Dec. 13, 1988, to Ohta et al, teaches a foamed interior panel which does not include a rigid substructure. Glass fibers are added to the foam material to create a semirigid polyurethane foam layer. The urethane foam eliminates the need for a rigid panel. Ohta et al does not teach molding an instrument panel having integral ducts which are used to support the foamed layer.

U.S. Pat. No. 4,806,293, issued to Akiyama et al, on Feb. 21, 1989, teaches a method of producing a molded article from a foamed thermoplastic material by injecting a thermoplastic resin in a mold cavity. The resin begins to foam and causes the expansion of the article in the mold cavity. The dies are operable to control compression pressure of the foamed article during the mold process. Akiyama et al does not teach foaming a space adjacent a rigid substructure and maintaining the pressure in the space to avoid deflection of the rigid substructure. The foamed article in Akiyama et al is not integrally molded onto a sheet member or a rigid substructure.

It is an object of the present invention to provide a method of manufacturing a foamed article having a rigid substructure which is not completely supported by a die.

It is a further object of the present invention to provide a method of making a molded article on a rigid substructure which is not supported by a die.

It is a further object of the present invention to produce a foamed instrument panel having integrally molded ducts. It is another object of the present invention to provide a panel having a nonuniform thickness of foam which displays a smooth exterior surface appearance.

It is a further object of the present invention to produce a foamed instrument panel having integrally molded ducts.

SUMMARY OF THE INVENTION

The present invention provides a method of manufacturing an article having a substructure with a wall having a wall surface and a foam layer along the wall surface, comprising the steps of: placing the substructure in a tool having a die surface being spaced apart from the wall surface; injecting a foamable material between the die surface and the wall; applying a clamp load between the die surface and the foamable material; allowing the foamable material to expand and exert a force on the wall; and reducing the clamp load on the foamable material to reduce the force exerted on the wall by the expanding material whereby the force exerted on the wall does not deform the article.

The clamp load exerts a force on the expanding foam. The clamp load together with the internal pressure of the expanding foam creates a clamp pressure. Foam pressure is the pressure on the finishing layer and rigid substructure due to the expanding foam. The clamp load is reduced during the foaming. The reduced clamp load permits a slight expansion of the foam and reduces the clamp pressure and the foam pressure. The reduced clamp pressure avoids deflection of the substructure and produces a warp-free panel.

The foaming reaction causes an increase in both the temperature and pressure within the space. The increased pressure is monitored, and when it reaches a predetermined amount, the clamp load and thereby the clamp pressure is reduced or eliminated. The reduced clamp pressure reduces the strain on the foaming material and the resultant foam pressure rise. When using very heavy tooling or a thin walled rigid substructure, the tooling may be moved or raised to eliminate all external pressure on the foaming material.

The methods of the present invention permit the use of close-mold foaming of articles having rigid substructures which are not completely supported by a mold die. Rigid substructures which include an unsupported or hollow section are useful for automotive applications such as instrument panels and door trims. The unsupported section may comprise hollow ducts and conduits within the rigid panel. The unsupported section may also include a section of a panel which has reinforcing ribs projecting away from the foam which makes supporting the rigid panel by a die difficult. The use of unsupported sections permit the production of a finished panel having fewer pieces.

Rigid substructures which are manufactured by blow-molding or injection molding to include unsupported sections such as integral ventilation ducts are generally not capable of being completely supported by a die. Integrally molding the ventilation ducts and conduits into the rigid substructure eliminate the need for add-on duct work. Support structure such as reinforcement brackets and beams may also be integrally molded into the panel using the same techniques. Integrally molding ducts and structure into the substructure simplifies the manufacture and assembly of the completed instrument panel.

Most automotive-type instrument panels are manufactured using a foaming process which causes an exothermic reaction in the foaming material. The exothermic reaction increases the temperature of the foaming material. The exothermic reaction also increases the pressure within the foaming material. This increased temperature and pressure is sufficient to cause the deflection of a rigid substructure made from a plastic material if the rigid substructure is not completely supported by a die. Deflection of the rigid substructure causes irregularities in the finished article. These irregularities may detract from the finished appearance of the article.

To avoid deflection of the rigid panel by the expanding foam, the present invention teaches reducing the clamp pressure applied between the finish layer and rigid substructure by reducing the clamp load applied by a press. The reduced clamp pressure reduces the strain on the foam material and the resultant pressure increase. The foaming material may increase slightly in volume over the entire surface area of the Panel. This increase in volume may occur only during the foaming process.

The invention is also believed useful in the molding of foamed panels having a nonuniform foam thickness. It is useful in some applications to Produce a foamed panel have a channel section of greater foam thickness. This can be useful to reduce to overall cost and weight of the panel. When these channels are filled with foam in a standard foaming process, they may tend to distort from the increased foam thickness after curing. It is believed that by relieving the clamp load during the foaming process, the interior pressure of the foam causes the channel section of the panel to evenly foam and produce panels having more uniform surface appearance when cured.

The present invention provides a method of manufacturing a foamed article using a rigid substructure which has one or more sections not completely supported by a mold die. A foamed instrument panel having integrally molded ducts is capable of being manufactured using a close-mold foam process. The invention also provides a method of manufacturing a close-mold foamed panel having integral ventilating ducts and conduits made from a blow-molded material. The invention also permits the molding of instrument panels having relatively thin, rigid substructures. By making the rigid substructure thinner, less material is used and the finished article is made lighter.

These and other objects, features, and advantages of the present invention will become more apparent to one of ordinary skill in the art upon reference to the following drawings and description of the invention.

DETAILED DESCRIPTION OF THE PREFERRED EMBODIMENTS

Figure 1:
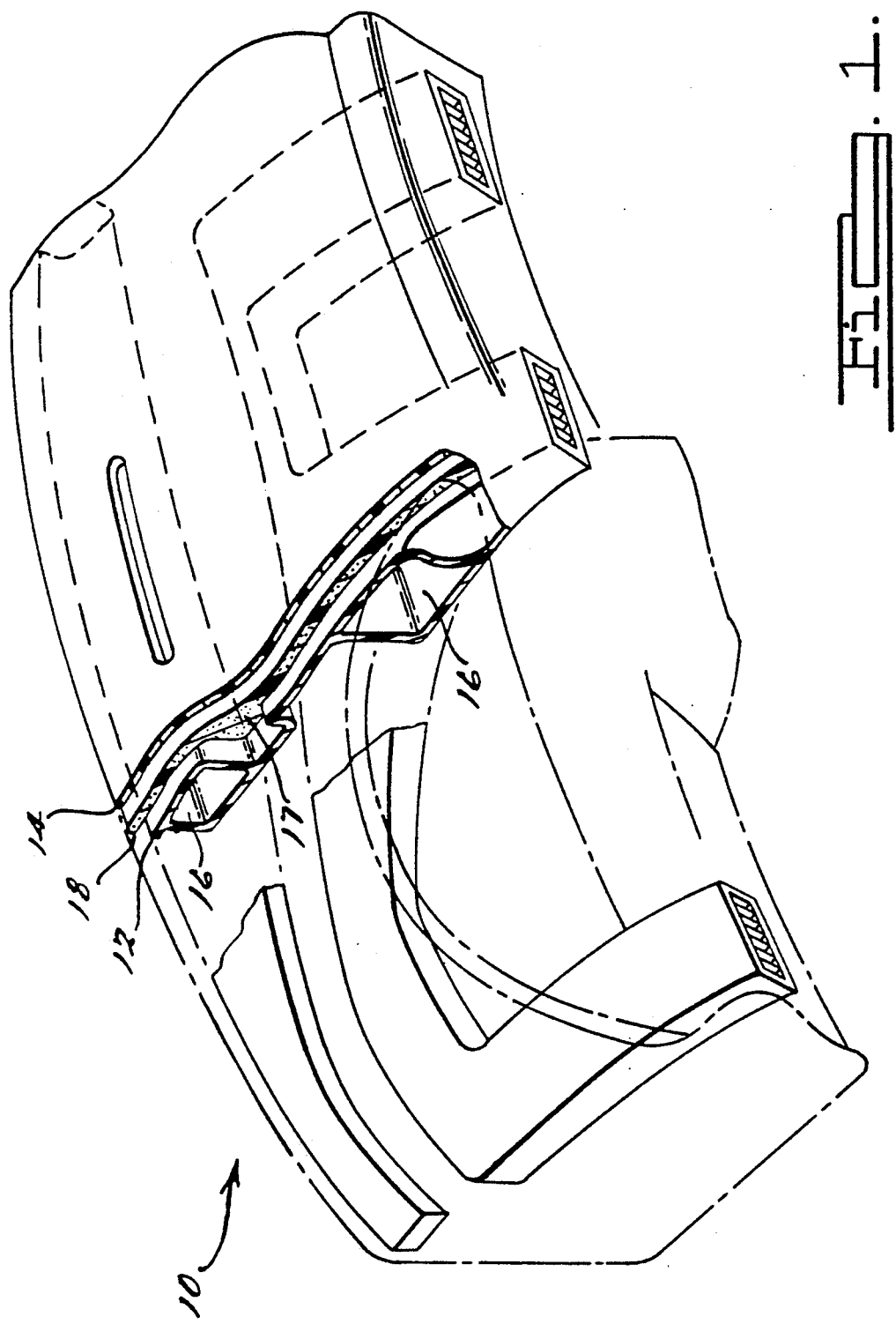
FIG. 1 is a perspective view partially broken away of a foamed instrument panel of an automobile having integrally molded ducts.

A preferred embodiment of the machine and method of manufacture of the present invention is described in the context of making an automotive instrument Panel. Instrument panel 10 is made in accordance with this invention and is shown in FIG. 1. Instrument panel 10 comprises a rigid substructure 12, an elastomeric foam layer 18, and a finish layer 14. Rigid substructure 12 is manufactured by injection or blow-molding to include one or more unsupported sections for integral ducts 16. An unsupported section, as used herein, is a section of rigid substructure which is not directly supported by a mold die. Ducts 16 may be for heating, cooling, ventilation, or defrosting, and generally run the length of instrument panel 10 and include openings along the face and top of the instrument panel. Ducts 16 communicate with the heat exchanger or condenser (not shown) for receiving conditioned air.

Additionally, rigid substructure 12 may include a channel section 17 which is used to make the instrument panel lighter. Channel section 17 contains a thicker section of foam than the remainder of panel 10. Rigid substructure 12 may be manufactured from a wood-based or plastic material. The plastic material may be either a thermoplastic or a thermoset material and may be reinforced with fibers or metal. Specifically preferred for automotive type instrument panels are acrylonitrile-butadiene-styrene, (ABS), styrene-maleic-anhydride (Dylark), and modified Polyphenylene oxide (Noryl). Particularly preferred for blow-molding rigid substructures is Noryl, manufactured by General Electric. Particularly preferred for injection molding is Dylark, manufactured by Arco Chemical.

A finish layer 14, generally made of a textured vinyl resin sheet, covers instrument panel 10. Finish layer 14 may be preshaped or integrally molded onto instrument panel 10. Between finish layer 14 and rigid substructure 12 is an expanded foam material 18 manufactured from polyurethane precursors. The materials and methods for manufacturing a closed mold foam panel are taught in U.S. Pat. No. 4,303,728 and are incorporated herein by reference.

Figure 2:
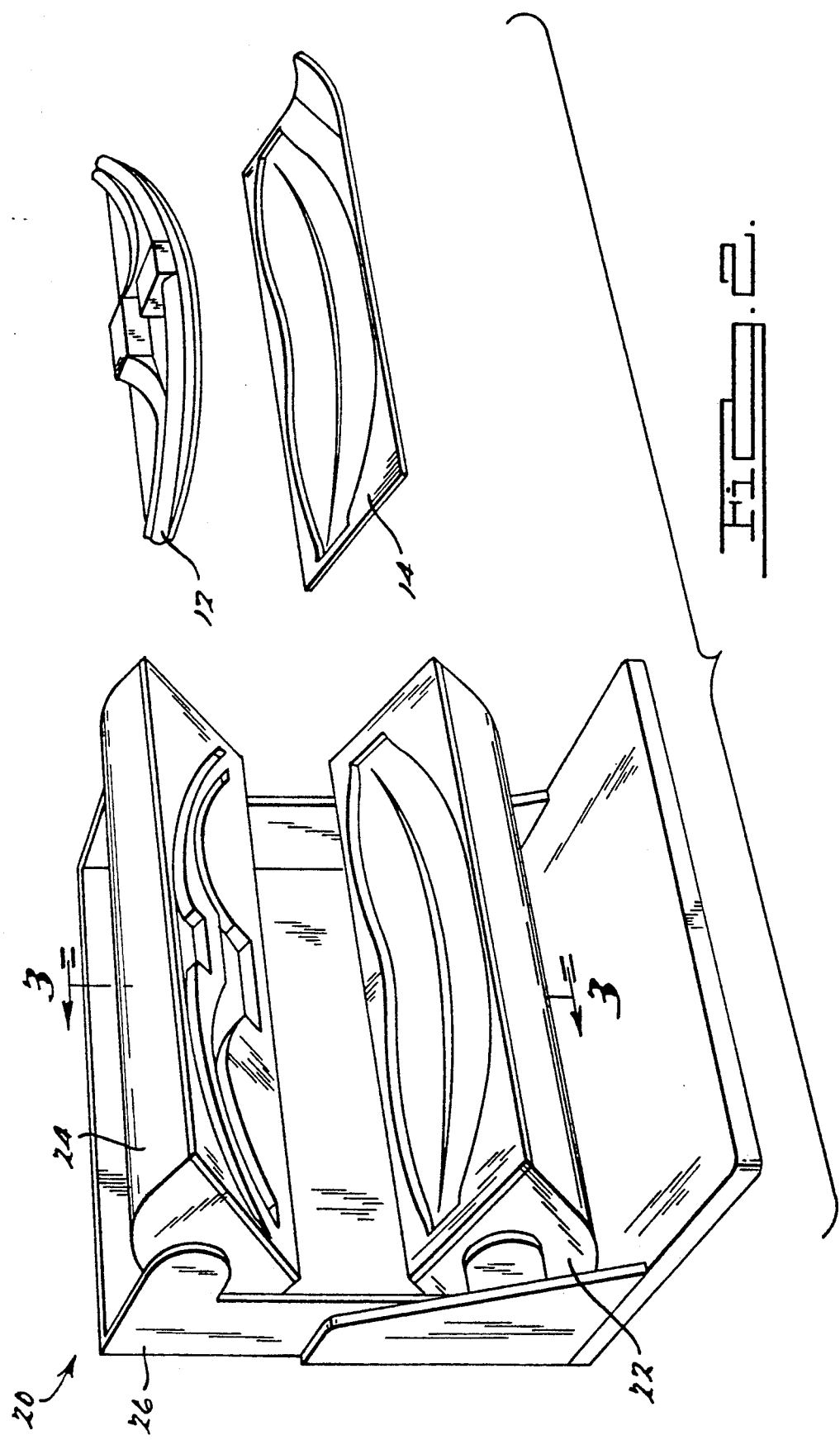
FIG. 2 is an exploded view of a mold tool and the relative positions of a rigid substructure and finish layer for the instrument panel shown in FIG. 1.

Alternatively, a self-skinning foam may be used in place of finish layer 14. In this instance, the foam provides a finished appearance and adheres to rigid substructure 12. Mold tool 20, shown in FIGS. 2 and 3, comprises hydraulic press 26 attached to first die 22 and second die 24. First die 22 is stationary and has an interior surface shaped to receive finish layer 14. Second die 24 has an interior surface shaped to receive rigid substructure 12. Rigid substructure 12 has been molded to include an unsupported section containing integral ducts 16 and channel 17. Finish layer 14 has been premolded in the shape of instrument panel 10.

Figure 3:
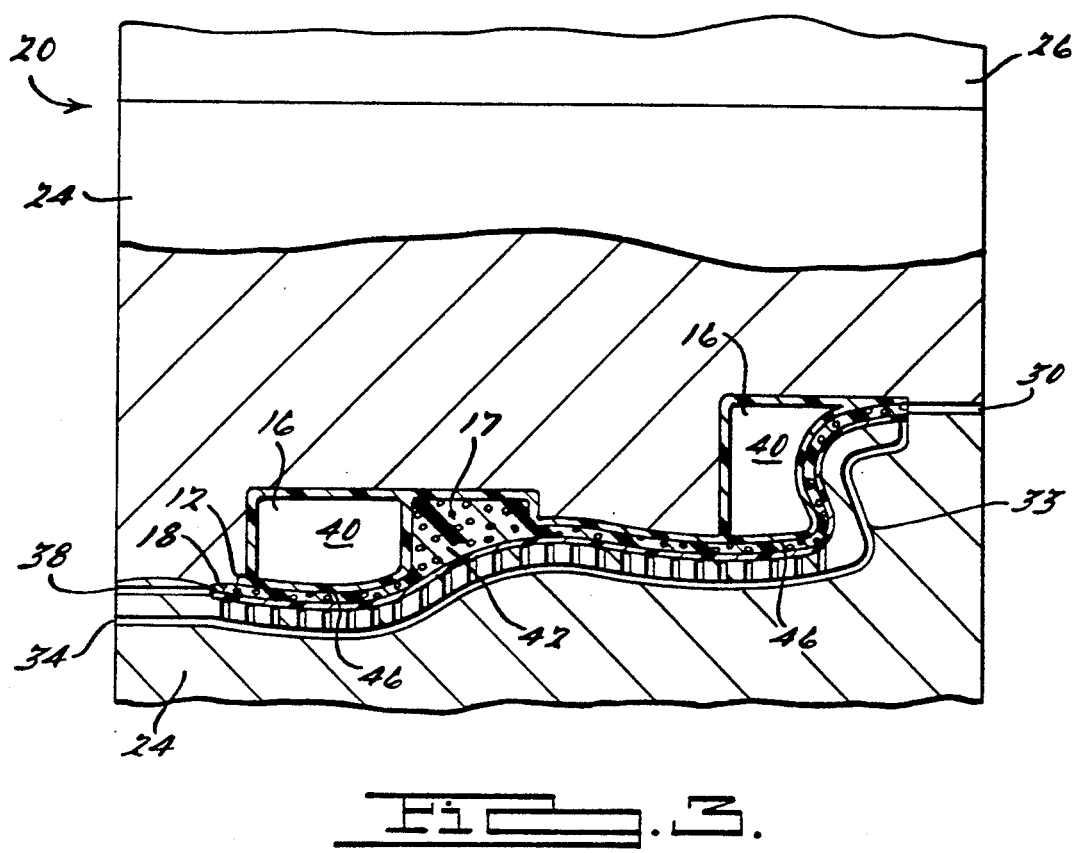
FIG. 3 is a sectional view taken along the line III—III of FIG. 2 showing the mold tool in the closed position.

Finish layer 14 is placed within first die 22. First die 22 includes vacuum channels 33 which communicate with vacuum source 34, as shown in FIG. 3. Vacuum source 34 applies a vacuum to channels 33 and draws finish layer 14 against first die 22. Rigid substructure 12 is placed in first die 22, overlying the finish layer 14. A space 42 is maintained between rigid substructure 12 and finish layer 14. Foam injectors 30 are positioned between finish layer 14 and rigid substructure 12 for injecting a foam precursor within space 42.

When mold tool 20 closes, second die 24 overlies rigid substructure 12. Press 26 closes dies 22,24, as shown in FIG. 3, and applies a clamp load of approximately 40 tons. Vacuum source 34 applies a vacuum to channels 36 and draws finish layer 14 tightly against the inner surface of first die 22. First die 22 may optionally be heated to increase the pliability of finish layer 14.

Substrate 12 has chamber wall surfaces 46 which are not directly supported by second die 24. Ducts 16 form chambers 40 which prevent second die 24 from being placed immediately adjacent wall surfaces 46. Walls surfaces 46 have a span unsupported by the die surface and are subject to deflection from a force applied opposite chamber 40. Foam injector 30 communicates with space 42. Foam precursors are injected within space 42. The foam precursor used in the manufacture of automobile instrument panels is a mixture of Polyol and isocyanate, manufactured by Olin Corporation. Vent 38 is opened to allow air within space 42 to escape during the foam injection. The precursor reacts to form polyurethane and $CO_2$ in an exothermic reaction.

Figure 4:
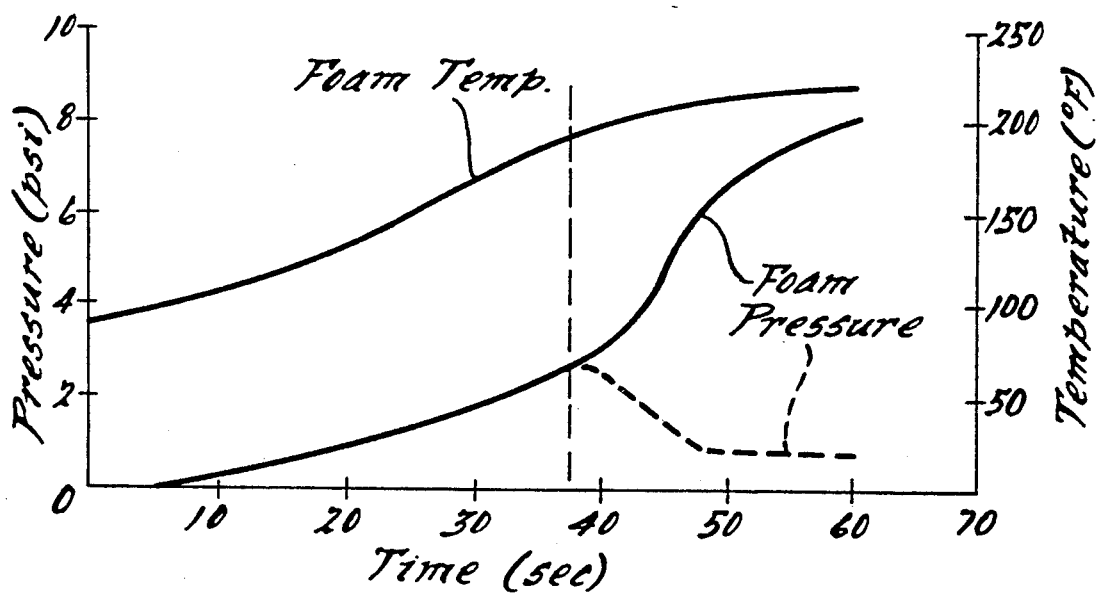
FIG. 4 is a graph of foam pressure and temperature plotted verses time.

Shown in FIG. 4 is a graph of Pressure and temperature verses time for the exothermic foaming reaction between Polyol and isocyanate occurring within space 42. The pressure within space 42 increases from approximately zero psi above normal atmospheric pressure to 8 psi, as shown by the solid line labeled "Foam Pressure". A pressure of 4 psi or greater in space 42 was found sufficient to deflect wall surfaces 46 when using a rigid substructure having an unsupported span of 8 inches and a wall thickness of 0.125 inches. To avoid the deflection of wall surfaces 46 by the increased pressure within space 42, the pressure within space 42 was maintained well below 4 psi by relieving the hydraulic press clamp load. Relieving the clamp load results in a lower foam pressure within space 42, as shown by the dashed line labeled "Foam Pressure" in FIG. 4.

While not wishing to be bound by the following theory, it is believed that as the expanding foam fills space 42, it exerts a force on the interior surfaces of finish layer 14 and rigid substructure 12. Because the clamp load applied to second die 24 greatly exceeds the internal foam pressure within space 42, the foam is constrained from further expansion. This causes a thermal strain within the foam. The strain within the foam tends to further increase the internal foam pressure and the resulting pressure rise. The foam pressure continues increasing until the foaming reaction terminates or the clamp load is relieved. It is these elevated foam and clamp pressures which cause the deflection of rigid substructure 12 in the unsupported areas of wall surfaces 46. Panel 10 is left in the mold under reduced clamp pressure to more fully cure. Once foam material 18 has cured sufficiently to adhere to both rigid substructure 12 and finish layer 14 and retain its finished shape, panel 10 is removed from the mold.

A pressure transducer (not shown) monitors the foam pressure within space 42 throughout the foaming reaction. When the pressure within space 42 increases to a predetermined amount, the clamp load applied by hydraulic press 26 is relieved. A minimum foam pressure is needed to assure foam 18 acts as a contact adhesive between finish layer 14 and rigid substructure 12. Pressure above that required for adhesive contact which could deflect rigid substructure 12 is avoided by reducing the clamp load.

Many methods of relieving the clamp load of hydraulic press 46 are known, including disabling hydraulic press 46, using bypass valves, raising the die, or using spaces. Relieving the clamp load reduces the external pressure applied to foam 18. Excessive gas ($CO_2$) is vented through vents. The foaming reaction of foam 18 continues to produce heat, but because the foam is permitted to expand, the internal pressure does not increase. Foam 18 is allowed to expand over the entire surface area of rigid substructure 12. Only the weight of second die 24 acts to constrain the expanding foam. It was found that the weight of conventional dies exerted a clamp pressure of less than 1.0 psi on the panel. After about 40 seconds of foaming, the foam expands in volume only slightly. The reduced clamp load does not significantly affect the expansion or thickness of the foam. In those situations where this tooling weight affects the foam expansion, the hydraulic press can be used to move the dies apart and eliminate external tooling constraints on the foam expansion.

The invention will be further described by way of example. The foaming reaction was recorded in the graph of temperature and pressure verses time in FIG. 4.

EXAMPLE 1

An instrument panel was produced having a rigid panel with an unsupported area 50 inches long and 8 inches wide, and a wall thickness of 0.125 inches. A shot weight of 1.29 Kgs of Polyol and isocyanate foam precursors at 90° F. were injected for about 2.15 seconds into space 42. The molds were preheated to 115° F. The precursors reacted with a small amount of water to form a gel and $CO_2$ gas. The expanding gel filled the space between the rigid substructure and finish layer and excess gas was vented. A clamp load of 40 tons was maintained throughout the foaming reaction. The foam pressure increased from near atmospheric pressure to about 8 psi above atmospheric in about 60 seconds. The unsupported areas of the rigid substructure experienced deflection and a greater than desired thickness of foam filled the space between the rigid substructure and finish layer. When the foam cooled and the finished panel was removed from the mold, the rigid substructure returned to near its undeflected condition and produced a panel with an unsightly lump over the unsupported areas.

EXAMPLE 2

An instrument panel was manufactured using the same process as described in Example 1, except that the clamp load was relieved at about 40 seconds after the foam precursors were injected. The foam pressure rapidly dropped from about 3.0 psi at 40 seconds to less than 1.0 psi as shown in FIG. 4. The panel was left in the tool under reduced clamp load and the foam was allowed to cure. The clamp pressure, due to the weight of the first die, was less than 1.0 psi on the rigid substructure after the clamp load was relieved. The foam expanded uniformly and slightly due to increased heat. No significant deflection of the rigid substructure was observed and the resultant panel presented a smooth exterior surface appearance.

The invention is also believed useful in the molding of foamed panels having a nonuniform foam thickness. The foam thickness in the area of channel 17 is roughly twice the thickness of the foam in the remainder of the panel. When manufacturing foamed panels having channel sections using a continuous clamp load, the foam in the channel section shrinks more than the remainder of the foam. The foam shrinkage produces a depression in the area of the channel. While not wishing to be bound by the following theory, it is believed that shrinkage is the same percentage for both thick or thin sections. Thicker sections will shrink more than thinner sections as the foam cools. By relieving the clamp load during the foaming process, the foam is permitted to expand in the area over the channel and cure while not under strain. This should produce a panel having a uniform exterior finish over the area of channel 17.

After a time/pressure relationship or temperature/pressure relationship has been established, as represented by the graphs labeled "Foam Pressure" and "Foam Temperature" in FIG. 4, pressure monitoring within space 42 is not required. Each mold would be initially calibrated. In production, pressure measurement of space 42 would be eliminated and the clamp load relieved according to the established time/pressure or temperature/pressure relationship. Most preferred is the use of the time/pressure relationship because no additional measuring need be performed within space 42. In this instance, the clamp load would be reduced at a predetermined time after the foam injection. The foam would have cured sufficiently to adhere to both finish layer 14 and rigid substructure 12, but not enough to build up a pressure which applies a force sufficient to deflect wall surfaces 46.

The invention, as described, permits the close mold foaming of a panel where the rigid substructure is not completely supported by the mold die. The pressure within the foamed space does not deflect the rigid substructure and thereby produce a deformed panel. The foam pressure in the area over a channel is allowed to equalize and should produce a panel having a smooth exterior surface.

The invention, as described, is suitable for use with thermoset as well as thermoformable rigid substructures. Integral ducts, conduits, and channels may be molded into the rigid substructure thereby reducing the number of components in a finished panel. The invention permits the use of thinner, lighter, and less expensive plastic materials for rigid substructure 12 and increases the design flexibility of an instrument panel.

The invention has been described in terms of an automobile instrument panel. However, the method of the present invention may be adapted to form other molded articles for both automotive and nonautomotive applications. It is understood that various modifications of the preferred embodiments can be used. For example, the teachings of the present invention are applicable for the manufacture of door trims, glove box doors, trunk liners, and other panels where continuous support of the rigid substructure by a die is difficult or impractical. It is understood by those skilled in the art, in view of the present disclosure, that various changes and modifications may be made without departing from the scope of the invention. Claims appended hereto are intended to cover all such changes and modifications.

We claim:

1. A method of manufacturing an article having a substructure with a wall having a wall surface and a foam layer along said wall surface, comprising the steps of:

placing said substructure in a tool having a die surface being spaced apart from said wall surface a first distance, said substructure having a channel section and a channel surface, said channel surface being spaced apart from said die surface a second distance, said second distance being larger than said first distance;

injecting a foamable material between said die surface and said wall;

applying a clamp load to said foamable material between said die surface and said wall;

allowing said foamable material to expand and exert a force on said wall; and reducing said clamp load on said foamable material to reduce the force exerted on said wall by said expanding material whereby said force exerted on said wall does not deform said substructure and foam shrinkage within said channel section is reduced.

2. The method of claim 1, wherein said wall comprises unsupported sections adjacent said wall surface, and said reducing step avoids deflecting said unsupported sections.

3. The method of claim 1, further comprising the steps of monitoring the pressure within said space and reducing said clamp load after the pressure within said space increases to a predetermined amount.

4. The method of claim 1, further comprising the steps of monitoring the temperature within said space and reducing said clamp load after the temperature within said space increases to a predetermined amount.

5. The method of claim 1, further comprising the step of reducing said clamp load at a predetermined time after said injecting step.

6. A method of manufacturing an article having a substructure with a wall having a wall surface and a foam layer along said wall surface, comprising the steps of:

placing said substructure in a tool having a die surface being spaced apart from said wall surface;

injecting a foamable material between said die surface and said wall;

applying a clamp load to said foamable material between said die surface and said wall;

allowing said foamable material to expand and exert a force on said wall; and reducing said clamp load on said foamable material by moving said die surface away from said wall to increase the space between said die surface and said wall surface by an amount whereby said foamable material is allowed to further expand by said amount to reduce the force exerted on said wall by said expanding material whereby said force exerted on said wall does not deform said substructure.

* * * * *